Nov. 10, 1953 P. M. COOK 2,658,310
APPARATUS AND PROCESS FOR THE PRODUCTION OF PHOTOSYNTHETIC
MICROORGANISMS, PARTICULARLY ALGAE
Filed Dec. 22, 1950 3 Sheets-Sheet 1
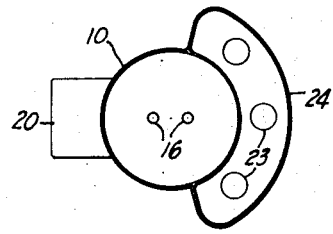
FIG_2_
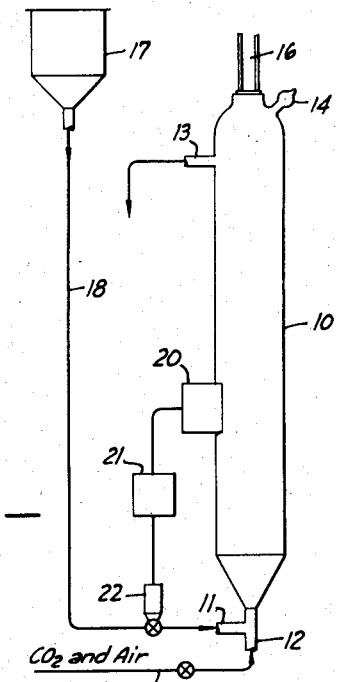
FIG_1_
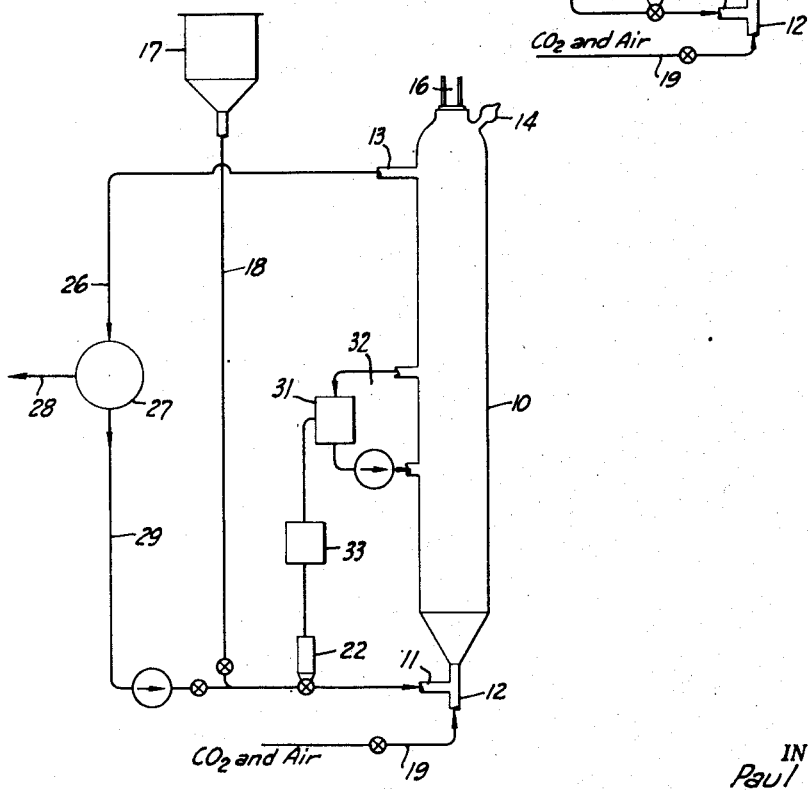
FIG_3_
INVENTOR.
Paul M. Cook
BY
ATTORNEYS Nov. 10, 1953  P. M. COOK  2,658,310
APPARATUS AND PROCESS FOR THE PRODUCTION OF PHOTOSYNTHETIC
MICROORGANISMS, PARTICULARLY ALGAE
Filed Dec. 22, 1950  3 Sheets-Sheet 2
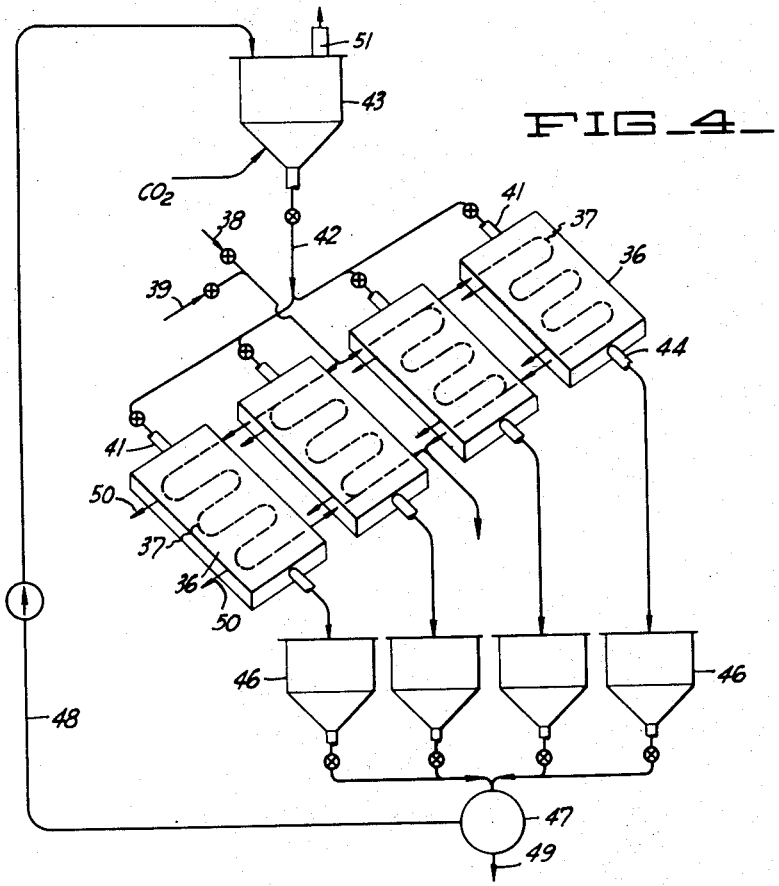
FIG_4_
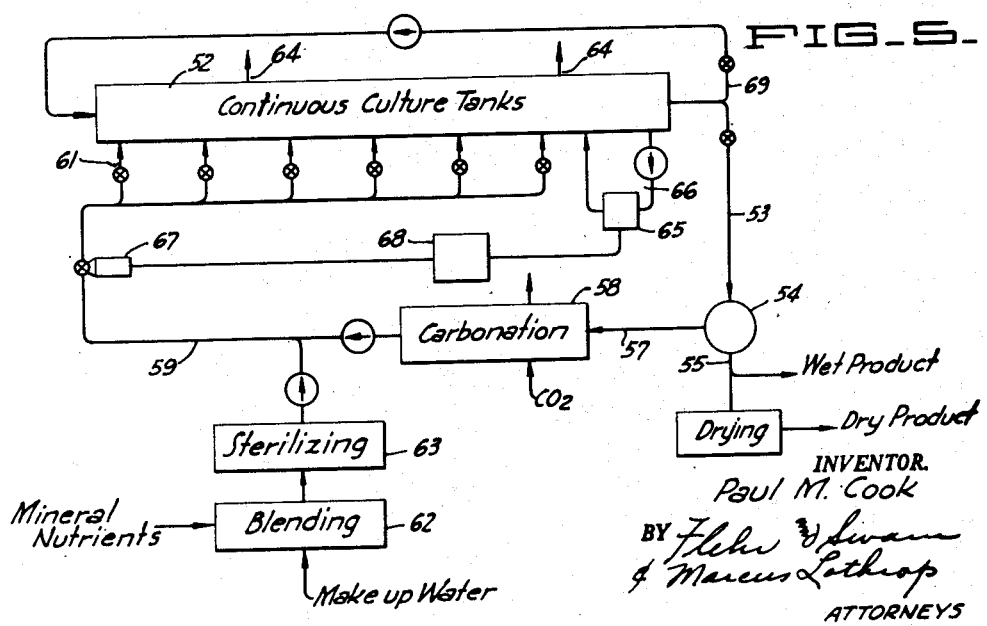
FIG_5_
INVENTOR.
Paul M. Cook
BY Flehr & Swain
& Marcus Lothrop
ATTORNEYS Nov. 10, 1953 P. M. COOK 2,658,310
APPARATUS AND PROCESS FOR THE PRODUCTION OF PHOTOSYNTHETIC
MICROORGANISMS, PARTICULARLY ALGAE
Filed Dec. 22, 1950 3 Sheets-Sheet 3
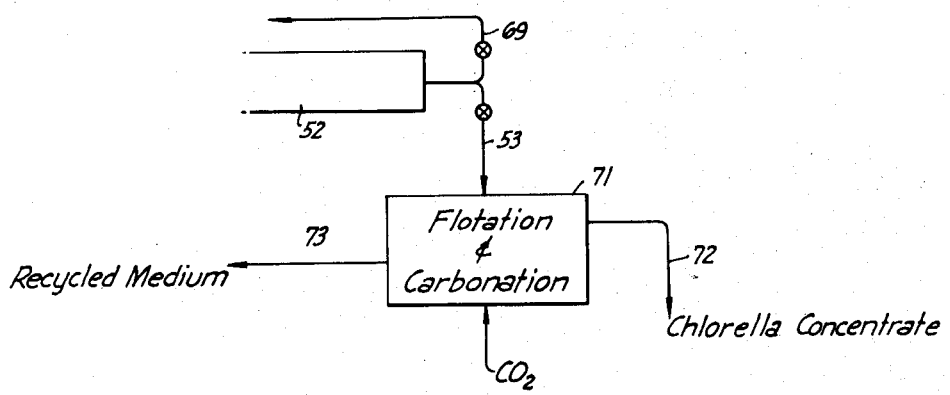
FIG_6_
FIG_7_
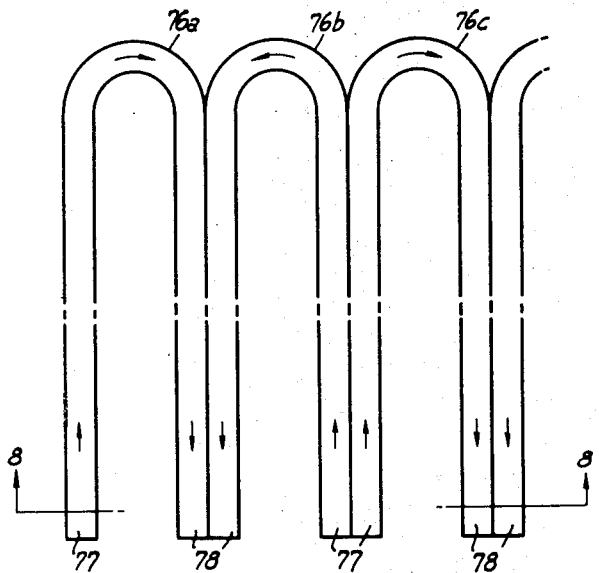
FIG_8_
INVENTOR.
Paul M. Cook
BY
ATTORNEYS Patented Nov. 10, 1953

2,658,310

UNITED STATES PATENT OFFICE 2,658,310

APPARATUS AND PROCESS FOR THE PRODUCTION OF PHOTOSYNTHETIC MICROORGANISMS, PARTICULARLY ALGAE

Paul M. Cook, Palo Alto, Calif., assignor to Carnegie Institution of Washington, Washington, D. C., a corporation Application December 22, 1950, Serial No. 203,429

26 Claims. (Cl. 47—58)

This invention relates generally to apparatus and processes for the production of microorganisms having photosynthetic characteristics.

Many organisms, including particularly algae, undergo photosynthesis in their growth, or in other words, their growth in a nutrient-containing medium requires absorption of light energy. It is known that microorganisms like algae represent potential sources of substances having commercial value, such as protein, fat, carbohydrate, vitamins and vitamin complexes, antibiotics and steroids. However, batch methods for their production which have been used in the past have been adapted for experimental laboratory studies and have not been suitable for large scale commercial use.

It is an object of the present invention to provide a process which is suitable for the large scale production of algae and other microorganisms having photosynthetic characteristics.

It is a further object of the invention to provide a process of the above character which will maintain optimum growth conditions for maximum effective yield.

Another object of the invention is to provide a process of the above character which will provide effective and efficient photosynthesis, having reference particularly to the manner in which the algae are subjected to light.

Another object of the invention is to provide a process of the above character which can be operated continuously for the continuous harvesting of algae for further processing.

Another object of the invention is to provide a process which is economical with respect to the nutrient chemicals and water required.

Another object of the invention is to provide a process of the above character in which the cells are not injured by continued exposure to high light intensities.

Another object of the invention is to provide a process of the above character which is characterized by flexibility of operation and ease of control under widely varying conditions of operation.

Another object of the invention is to provide novel apparatus for carrying out the present method.

Additional objects and features of the present invention will appear from the following description in which the preferred embodiments of the invention have been set forth in detail in conjunction with the accompanying drawing.

Referring to the drawing:

Figure 1 is a diagrammatic side elevational view of apparatus for carrying out the present invention.

Figure 2 is a detail illustrating the glass column of Figure 1 in cross-section and illustrating application of lamps as a source of light.

Figure 3 is a diagrammatic side elevational view similar to Figure 1 and showing a modification of the apparatus.

Figure 4 is a diagrammatic view illustrating another embodiment of the apparatus and indicating steps of the present process.

Figure 5 is a diagrammatic view illustrating a commercial plant installation for carrying out my process and indicating the steps involved.

Figure 6 is a modification of Figure 5.

Figure 7 is a plan view showing special culture tanks for carrying out the process.

Figure 8 is a cross-sectional view taken on the line 8—8 of Figure 7.

The present process makes use of continuous growth of a photosynthetic microorganism in a flowing stream of aqueous nutrient-carrying medium. The process can be applied to various types and species of algae or other microorganisms having suitable growth characteristics and valuable chemical constituents, and particularly the common alga, Chlorella. Chlorella can be readily grown in an aqueous medium containing inexpensive mineral nutrients, including particularly fixed nitrogen. The organism is unicellular and the individuals solitary. They are spherical in shape and normally from two to ten microns in diameter. Reproduction takes place through the formation within the adult cells of autospores, usually two, four, eight or sixteen in number. The autospores become complete cells and are then liberated by rupture of the parent cell wall. The species *Chlorella pyrenoidosa* has been selected as particularly well adapted for my process because of its chemical constituents and ability to produce relatively high yields.

Figure 1 of the drawing schematically illustrates laboratory apparatus which I have used in demonstrating one manner of practicing the invention. This apparatus consists of a vertically disposed column or container 10 formed of clear glass, plastic or like transparent or light transmitting material. The lower end of the column is provided with inlet connections 11 and 12 and the upper end with an overflow pipe 13 and a gas vent 14. A heat exchange tube 16 extends within the interior of the tube 10, and is connected to suitable means for circulating a cooling or heating fluid such as water or steam. Vessel 17 represents a source of the medium in which the Chlorella is to be grown. The medium is prepared by dissolving suitable mineral nutrients in water, as will be presently explained in detail. Line 18 represents flow of liquid medium from vessel 17 to the connection 11 at the lower end of the column 10. Line 19 represents introduction of gas containing carbon dioxide into the inlet 12, whereby such gas bubbles upwardly through the medium in column 10.

For automatic control it is desirable to provide a photoelectric device 20 positioned along one side of the glass column and adapted to receive light transmitted through the same from a lamp (not shown) or other light source of constant intensity. The electrical circuit of this photoelectric device can include electronic amplifying means 21, and is connected to suitable flow control means such as the solenoid operated valve 22, which controls flow of medium through the line 18.

The column 10 is exposed to either artificial or sunlight. Artificial lighting means is indicated in Figure 2 as comprising the fluorescent tubes 23, positioned within the reflector 24, and disposed alongside the glass column 10.

Operation of the apparatus shown in Figure 1 (and the process thereby indicated) is as follows: The glass column is filled with the liquid medium employed and is inoculated with a culture (i. e. inoculum) of the microorganism to be grown. Care is taken to maintain the temperature of the column within a range optimum for growth of the microorganism. This may involve circulating a cooling or heating medium through the tubes 16. Carbon dioxide is continuously supplied to provide the necessary available carbon for photosynthesis as well as to provide continuous agitation to maintain the liquid medium in turbulent condition. As the cells of the microorganism grow and reproduce, the cell population density of the algal suspension (i. e. cells per unit volume of the medium) increases until a condition is reached where the density is optimum for maximum yield, taking into account such factors as rate of growth, desired composition of the product algae, and light intensity. The apparatus can now be started in continuous operation by controlled continuous admission of prepared medium into the lower end of the column, whereby a continuous overflow is established through pipe 13 consisting of liquid medium together with cells to be harvested. Thereafter the cell population density is maintained substantially constant throughout the height of the column.

The photoelectric device 20 is adjusted to respond to changes in the cell population density in the region of the column 10 which is adjacent to this device. In this connection it may be explained that as the cell population density increases, light absorption increases accordingly. In other words, for a given thickness of medium, reduction of light intensity will be of a given value for a certain cell population density, and the reduction in light intensity increases or decreases with an increase or decrease in density. Therefore, it is possible to adjust the photoelectric device 20 whereby the flow of liquid medium through line 18 is decreased when the cell population density of the medium being viewed falls below a desired value, and increased when the density exceeds the desired value. In this manner the cell population density in the overflow 13 can be kept substantially constant, and within an optimum range for efficient yield. Also this automatic control provides for a supply of fresh nutrients to maintain the nutrients present within ranges of concentrations which promote optimum growth and reproduction of the cells.

Such variables of the process as the type of medium, concentration and character of nutrients in the medium, temperature and time relationships, depend in part upon the specific organism being produced and the desired chemical composition of this organism. Assuming that the process is being applied to *Chlorella pyrenoidosa*, the medium can be prepared from sterilized tap water with added mineral nutrients suitable for the desired growth of this organism. The mineral nutrient requirements include sources of the following ions: Magnesium, potassium, iron, sulphate, phosphate and fixed nitrogen. A suitable range of concentration of these ions is as follows:

| | |
|---|---|
| Magnesium ($Mg^{++}$) | .001 to .05 M. |
| Potassium ($K^+$) | .001 to 0.1 M. |
| Iron ($Fe^{++}$ or $Fe^{+++}$) | $0.1 \times 10^{-5}$ to $0.5 \times 10^{-4}$ M. |
| Sulphate ($SO_4^=$) | .005 to .1 M. |
| Phosphate ($PO_4^=$) | .001 to .05 M. |
| Fixed nitrogen | .0015 to .1 M. |

Certain other elements are beneficial in trace quantities. Dissolved salts in tap water and the impurities present in commercial salts generally provide ample amounts of these microelements.

In the above table the fixed nitrogen concentration is over 0.001 molar. This is on the assumption that the process is being carried out to produce a Chlorella product having a relatively high protein content. The process can be employed for producing a high fat content Chlorella by use of a nutrient medium containing over 0.001 molar fixed nitrogen concentration, and thereafter continuing the process with a fixed nitrogen concentration below 0.001 molar.

Relatively inexpensive inorganic minerals can be used to supply the nutrient ions referred to above. The following specific formulas can be mentioned by way of example:

Formula No. 1

| | | |
|---|---|---|
| Ammonium chloride ($NH_4Cl$) | 0.00225 | M |
| Potassium chloride ($KCl$) | 0.0300 | M |
| Magnesium sulphate ($MgSO_4$) | 0.0100 | M |
| Potassium dihydrogen phosphate ($KH_2PO_4$) | 0.0100 | M |
| Iron ($Fe^{++}$ or $Fe^{+++}$) | $0.5 \times 10^{-5}$ | M |

Formula No. 2

| | | |
|---|---|---|
| Potassium nitrate ($KNO_3$) | 0.0250 | M |
| Magnesium sulphate ($MgSO_4$) | 0.0200 | M |
| Potassium dihydrogen phosphate ($KH_2PO_4$) | 0.0180 | M |
| Iron ($Fe^{++}$ or $Fe^{+++}$) | $0.5 \times 10^{-5}$ | M |

Formula No. 3

| | | |
|---|---|---|
| Ammonium hydroxide ($NH_3OH$) | 0.00225 | M |
| Potassium chloride ($KCl$) | 0.0300 | M |
| Magnesium sulphate ($MgSO_4$) | 0.0100 | M |
| Potassium dihydrogen phosphate ($KH_2PO_4$) | 0.0100 | M |
| Iron ($Fe^{++}$ or $Fe^{+++}$) | $0.5 \times 10^{-5}$ | M |

Adjust pH with HCl to 6.0.

It is satisfactory to use sterilized tap water in preparing the medium. Tap water generally contains iron in ample amounts, and as previously mentioned it contains other micro elements which may be beneficial. A micro element solution can be added to any one of the above formulas, such as 0.5 ml. per liter of the A5 solution of Arnon (see Arnon, D. I., Am. J. Bot., 25, 322; 1938).

In Formula No. 1 the ammonium chloride provides fixed nitrogen in the form of ammonium ($NH_4^+$) ions. In Formula No. 2 the potassium nitrate provides fixed nitrogen in the form of nitrate ($NO_3^+$) ions. In Formula No. 3 ammonium ions are provided by the use of aqua ammonia or by the introduction of anhydrous ammonia into the medium.

For each species of organism it will be found that nutrient concentrations within certain limits will afford optimum growth of cells. For the species *Chlorella pyrenoidosa* the chemical constituents of harvested cells is dependent particularly upon the concentration of fixed nitrogen. Concentrations of fixed nitrogen over 0.001 molar will produce cells having a relatively high protein content (e. g. in excess of 50%). If after producing high protein Chlorella the nitrogen concentration is reduced to less than 0.001 molar and growth continued, Chlorella can be obtained having a relatively high (e. g. in excess of 50%) lipid content.

Growth of the cells is not highly critical with respect to hydrogen ion concentration. Thus with *Chlorella pyrenoidosa* the pH of the medium may range from 3.5 to 9, about 4.5 to 6.5 being considered optimum. The hydrogen ion concentration of the medium may be adjusted from time to time to maintain the medium neutral or on the acid side, as by addition of mineral salts capable of providing an acidic or basic reaction.

The temperature level at which the medium is maintained should be selected for optimum growth. For the species *Chlorella pyrenoidosa* the temperature may range from 15 to 28° C., about 20 to 25° C. being considered optimum. The cells are not harmed by a temporary drop in temperature, as during periods when no light is being applied. Thus no adverse effects have been noted by permitting the temperature to fall as low as 7° C. When the temperature is restored to the range of from 20 to 25° C., and light applied, the cells commence normal growth. Temperatures considerably higher than about 28° C. should not be applied, because such treatment tends to cause injury and death of the cells. Sunlight may raise the temperature of the column 10 about 28° C., and under such conditions it is desirable to circulate cooling water through the tubes 16 to maintain the temperature between the optimum limits of from 20 to 25° C.

It is essential to provide dissolved carbon dioxide, or carbonate or bicarbonate ions (collectively referred to in the claims as available carbon dioxide) for growth of the cells. In the process as described above (Figure 1) the medium is continuously aerated with a gas containing a small percentage of carbon dioxide. For the species *Chlorella pyrenoidosa* it is satisfactory to aerate with a gaseous medium comprising 5% carbon dioxide and the remainder a gas such as air, nitrogen or the like.

The gas continuously vented from the upper end of the column includes gas produced as a by-product of photosynthesis, such as oxygen in the case of Chlorella. Thus oxygen or other by-product gas is prevented from attaining proportions deleterious to cell growth.

As previously mentioned the light employed may be either natural sunlight or light produced from suitable artificial lamps. The useful range of light wave lengths for growth of Chlorella approximate the visible spectrum. Either ordinary commercial filament or fluorescent lamps can be used. The expense of artificial light sources for commercial use is high, and, therefore, sun light is preferred for commercial low cost production.

Considering light applied to a single cell, the cell grows more rapidly and to a greater size before reproducing as the light intensity increases. However, it appears that when the light intensity increases beyond a certain value the growth rate and maximum cell size remain substantially constant. This effect may be defined as a light saturation condition of the cell. When a *Chlorella pyrenoidosa* cell is subjected to relatively intense light, as, for example, sunlight of an intensity greater than 4000 foot candles, the cell grows quite rapidly at first, and then it appears that some cell injury occurs which diminishes the growth rate, until finally the cell may die.

Ordinary sunlight such as is available in many parts of the United States may reach intensities well above 4000 foot candles. Due to a peculiar characteristic of my process, exposure of the column 10 to such intense sunlight does not result in cell injury. This is because the entire height of the column is subjected to continuous agitation by virtue of the carbon dioxide and air being introduced by way of line 19. Turbulence within the column causes individual cells to be moved about within the upwardly flowing column, whereby the distance of an individual cell from the side walls of the column is continuously varying between maximum and minimum values. Due to mutual shading of the cells, as a particular cell moves in a direction to increase its distance from the illuminated side wall of the column 10, the incident light to which it is subjected decreases accordingly. Thus individual cells are being subjected to light intensities which continuously vary between maximum and minimum limits. This prevents the possibility of cells being subjected to extreme light intensities for periods of time such as might interfere with proper growth and reproduction or might injure or cause death of the cells.

As previously stated, it is desirable to operate the process whereby the rate of growth and cell population density obtained make for maximum yield. It is convenient to measure population density by the amount of dry weight of solids attributed to the cells, for unit volume of the medium. For *Chlorella pyrenoidosa* I have found it practical to maintain population densities of the order of 0.36 gram dry weight of cells per liter, although for practical purposes this value can vary from 0.28 gram dry weight per liter to 0.42 gram dry weight per liter without causing important reduction in yield. With the continuous process of Figure 1, the material discharging through the overflow pipe 13 is maintained at substantially constant population density, and for a particular organism this density should be selected whereby under the conditions maintained, the rate of growth is such as to afford maximum yield. Other important factors of the process, including particularly the rate with which medium is introduced through the line 18, should be adjusted for the purpose of maintaining an optimum rate of growth and the population density constant.

In my laboratory work the process was carried out in such a manner as to prevent introduction of undesired contaminants. This equipment was sterilized prior to starting an operation. Also the medium containing the mineral nutrients was sterilized by heating the same to an elevated temperature of 100° C. for a period such as 30 minutes, and this treatment was repeated after a period of 24 hours. The gas used for aeration was sterilized and filtered by passing it through sterile cotton. The vent 14 was provided with a suitable filter element to prevent entrance of contaminants from the atmosphere.

Various conventional methods can be employed for separating or harvesting the Chlorella from the medium. Thus I may employ known separating methods such as centrifuging, flotation or filtration. The wet concentrate obtained from such separating methods can be dried as by use of spray drying equipment to produce a final powdered product.

As a typical example a moderately high protein Chlorella produced by my process may analyze as follows:

|  | Percent |
|---|---|
| Protein | 54.0 |
| Lipid (fat) | 11.6 |
| Carbohydrate | 34.4 |
| (Ash free basis) | |

A relatively high fat Chlorella produced by growth in a medium containing over 0.001 molar fixed nitrogen, followed by continuing the process with a fixed nitrogen concentration below 0.001 molar, may analyze as follows:

|  | Percent |
|---|---|
| Protein | 15.7 |
| Lipid (fat) | 65.3 |
| Carbohydrate | 19.0 |
| (Ash free basis) | |

A typical essential amino acid composition for Chlorella produced by my process is as follows:

| Amino Acid | Percent Chlorella Protein |
|---|---|
| Arginine | 5.98 |
| Histidine | 1.62 |
| Isoleucine | 4.22 |
| Leucine | 5.00 |
| Lysine | 6.08 |
| Methionine | 1.43 |
| Phenylalanine | 5.35 |
| Glycine (non-essential) | 5.50 |
| Threonine | 4.77 |
| Tryptophane | 1.02 |
| Valine | 6.68 |

The vitamin content of a typical Chlorella product produced by my process is as follows:

| | |
|---|---|
| Vitamin A (I. U. per lb.) | 363,000.0 |
| Thiamin ($\mu$gm. per gm.) | 10.0 |
| Riboflavine ($\mu$gm. per gm.) | 36.0 |
| B$_6$ (as pyridoxine) ($\mu$gm. per gm.) | 23.0 |
| Pantothenic acid ($\mu$gm. per gm.) | 20.0 |
| Niacin ($\mu$gm. per gm.) | 240.0 |
| Biotine ($\mu$gm. per gm.) | 0.147 |
| Choline ($\mu$gm. per gm.) | 3,014.0 |
| B$_{12}$ ($\mu$gm. per gm.) | .022 |
| Folic acid ($\mu$gm. per gm.) | 11.66 |

The foregoing analyses make clear that Chlorella is a potential source of feed stuff and chemicals. It can be used as a base material for animal feeds, with or without other substances, or it can be processed to produce various chemicals.

Figure 3 illustrates another embodiment of the process in which the major part of the medium withdrawn through the overflow 13 is continuously recirculated through the column 10. Line 26 represents algal suspension being continuously removed from the upper end of the column, and being continuously treated by the separating means 27 to produce a Chlorella concentrate 28 and a medium 29 which is relatively free of cells. The medium is shown being continuously returned to the lower end of the column. The makeup medium from 17 can consist in this instance of water together with such dissolved minerals as are necessary to maintain optimum nutrient concentration within the column 10. The principal chemical to be supplied in this manner is fixed nitrogen. The amount of liquid added by way of line 18 can be equal to liquid removed at 28, plus liquid which may be wasted from the system.

The photoelectric device 31 in this instance is associated with the external flow circuit 32, which is connected at spaced points to the column 10. Thus algal suspension from the column is continuously passed through a transparent vessel disposed between a photoelectric tube and a standard source of light. Suitable amplifying means 33 is connected with the photoelectric device and serves to operate the solenoid valve 22. Thus this valve is operated responsive to the cell population density. Such an external circuit operates in substantially the same manner as the arrangement of Figure 2 and thus these arrangements can be employed interchangeably.

Figure 4 illustrates another type of apparatus which is suitable for carrying out my process. A plurality of culture containers 36 are supported in horizontal position and are connected to common means for supplying the medium. The bottom sides of the containers are shown provided with heat exchange coils 37 which are adapted to be connected to either a source of cooling water 38, or a source of heating steam 39. Automatic thermostatically controlled valve means can be provided for controlling admission of cooling water or steam to the coils, thereby maintaining the medium within the culture containers at a desired temperature level. The cover of each container is formed of suitable transparent material such as glass or suitable plastic. The inlets 41 for the containers are connected to a common medium supply pipe 42, which can receive medium from the tank 43.

The outlet end of each culture container can be provided with an overflow weir (not shown) and an outlet 44 which discharges into a storage tank 46. The material from all the storage tanks can be passed to the separating means 47, which can be of the centrifuge type. The overflow from the separating means forms the medium return 48, while the underflow 49 is a wet Chlorella concentrate.

The necessary available carbon dioxide can be added to the medium in the tank 43, whereby this medium is carbonated before it enters the culture containers. It is also possible to introduce the carbon dioxide directly into the culture containers by aeration, or in other words in the same manner described with reference to Figures 1 and 3. Thus an aerating medium comprising air and 5% or more carbon dioxide can be continuously introduced at various points along the length of each container 36.

Each of the containers 36 is shown provided with suitable venting means 50 corresponding to the vent 14 for the vertical column of Figure 1, and through which by-product gas (i. e. oxygen) can be removed. Also the tank 43 can be provided with a venting device 51.

Each container can be directly supplied with carbon dioxide whereby an atmosphere containing carbon dioxide is maintained above the streams and from which the algal suspension may absorb carbon dioxide.

I prefer to maintain a flow velocity through each container 36 which is sufficient of itself to maintain a condition of turbulence. An optimum condition of turbulence is maintained where the Reynolds number is maintained well above 2100. By the maintenance of substantial flow velocities it is unnecessary to rely upon turbulence produced by aeration. Turbulence obtained by proper flow velocity serves to maintain the cells in suspension, to maintain equilibrium conditions between the nutrients and each cell, and to cause the cell to be exposed to light intensity which is continuously varying between maximum and minimum limits, thus preventing injury to the cells and maintaining optimum growth rates.

To facilitate maintenance of flow velocities for the desired condition of turbulence, a part of the algal suspension discharging from each container can be directly recirculated, without passing through the separating operation 54 or the tank 43. Such recirculation can be applied individually to each container or as a circuit applied to all of the containers as a group.

While no photoelectric control means is indicated in Figure 4 for controlling admission of medium to the culture containers, it is to be understood that suitable means can be employed similar to the arrangement illustrated in Figure 3. Thus an external circuit like that illustrated in Figure 3 can be connected to one of the culture containers and the photoelectric means employed to operate a valve which in turn controls flow of medium through line 42.

Figure 5 illustrates an embodiment of the invention for large scale commercial operations. A group of large sized continuous culture containers is indicated at 52, and the outlet 53 from these containers is shown being treated at 54 for the removal of a Chlorella concentrate 55. The relatively cell-free medium 57 thus obtained is shown being carbonated at 58, and returned by line 59 to the culture containers. Line 61 represents introduction of the returned medium into the culture containers at spaced points along their length for the purpose of maintaining a substantially constant concentration of nutrients (including available carbon dioxide) in the medium throughout the length of each culture container. In addition, this feature together with continuous recirculation aids in maintaining the cell population density substantially the same for the entire length of the container. In the carbonating operation 58, carbon dioxide can be introduced into the medium to provide sufficient available carbon dioxide for optimum rate of cell growth in the culture containers. Makeup water is shown being blended at 62 with mineral nutrients including particularly fixed nitrogen, and is merged with the recirculated medium for supplying the culture containers. A sterilizing operation 63 may be applied to eliminate undesired contaminants.

Venting means 64 are indicated for the culture containers and serve to remove by-product gas.

Automatic control means is indicated for the apparatus of Figure 5 by the photoelectric device 65, which is connected in an external circuit 66. A solenoid operated valve 67 is shown for controlling flow of medium through line 59, and is indicated as being automatically operated by the amplifying means 68. The automatic operation is such that the flow through line 59 is regulated to maintain the cell density at an optimum and substantially constant value. In place of this external circuit a control arrangement as shown in Figure 2 can be applied directly to one of the culture containers.

As with Figure 3 part of the removed algal suspension can be continuously recirculated without removal of cells, as indicated by line 69. This facilitates maintenance of the desired condition of turbulence in the culture containers.

Figure 6 illustrates a modification of the arrangement shown in Figure 5, in which carbonation is combined with the Chlorella separating operation. Thus in this instance the outflow 53 from the culture containers 52 passes to the combined flotation and carbonating operation 71, where the material is carbonated with carbon dioxide gas, and is subjected to froth flotation by the use of one or more suitable collecting agents. A suitable collecting agent is known by the trade-name of "Quarternary O." This agent is an alkylated imidazolinium chloride and is marketed by Alrose Chemical Company. As a result of combined flotation and carbonation, a froth concentrate 72 is removed which contains the harvested Chlorella, and a carbonated medium 73 is obtained which is suitable for recycling. In such a combined flotation and carbonating operation the gas introduced aids the flotation operation. This gas can consist of air enriched with carbon dioxide or flue gas having a sufficient carbon dioxide content to produce the necessary degree of carbonation of the recycled medium.

For commercial equipment the culture containers should be of substantial length for economical yield. A convenient container construction is illustrated in Figures 7 and 8. In this instance the grouped containers 76a, 76b and 76c are made U-shaped, and are extended over a substantial ground area graded to provide a gradual slope for gravity flow. The inlet portions 77 are elevated with respect to the discharge portions 78. These containers can be in the form of shallow vessels provided with transparent upper walls 79 as illustrated. A shallow trough 81 can be provided upon each wall 79 for receiving a thin layer of cooling water. For a relatively wide range of climatic temperatures these containers can be provided with heat exchange means to maintain the temperature between optimum limits.

Assuming use of containers as illustrated in Figures 7 and 8, and the introduction of recycled medium at points distributed along the length of each container, the population density can be maintained relatively constant along the complete length of each container, and likewise the nutrients can be maintained at a substantially constant and optimum concentration.

In all of the above embodiments of my process and apparatus I provide for the continuous mass culture of Chlorella or like microorganisms. The plant equipment required for a commercial installation is relatively simple to control and operate. The process makes effective use of an optimum rate of cell growth to produce an effective over-all yield of cells. Recycling of medium makes possible economies with respect to nutrients and the amount of medium required, as well as to provide turbulence and the other features previously mentioned.

I claim:

1. In a process for the production of photosynthetic microorganisms, the steps of maintaining a body of a nutrient-containing aqueous medium, causing cells of a photosynthetic microorganism to grow in said medium while the body 1. is exposed to light, maintaining said cells in motion in said body during their growth therein, and continuously removing grown cells from said body.

2. In a process for the production of photosynthetic microorganisms, the steps of maintaining a body of a nutrient-containing aqueous medium, continuously supplying further medium to said body to maintain turbulence therein, causing cells of a photosynthetic microorganism to grow in said medium while said turbulent body is exposed to light, and continuously removing said cells from said body.

3. In a process for the production of photosynthetic microorganisms, the steps of maintaining a continuously flowing stream of a nutrient-containing aqueous medium, causing cells of a photosynthetic microorganism to grow in said medium while said continuously flowing stream is exposed to light, continuously removing said cells from said continuously flowing stream, and continuously supplying nutrients to said continuously flowing stream.

4. In a process for the production of photosynthetic microorganisms, the steps of maintaining a continuously flowing stream of nutrient-containing aqueous medium, said stream being exposed to light and containing fixed nitrogen and available carbon dioxide, causing cells of a microorganism to grow in said stream to provide a cell suspension, continuously supplying medium to said stream, continuously removing cells from said stream and regulating the rate of introduction of said medium to said stream to maintain the cell population density of the suspension substantially constant for any one region of said stream.

5. In a process for the production of photosynthetic microorganisms, the steps of maintaining a continuously flowing stream of a nutrient-containing aqueous medium, said stream being exposed to light and containing fixed nitrogen and available carbon dioxide, the flow velocity of said stream being maintained at a value sufficient to provide turbulence therein, causing cells of a photosynthetic microorganism to grow in said turbulent stream to provide a cell suspension, continuously withdrawing said cells from said stream and continuously supplying a nutrient-containing aqueous medium to said stream.

6. In a process for the production of photosynthetic microorganisms, characterized by the use of an elongated container having a light transparent wall; the steps of maintaining a continuous flow of nutrient-containing aqueous medium throughout the length of said container, said medium containing fixed nitrogen and available carbon dioxide, causing cells of a photosynthetic microorganism to grow in said stream while said wall and said stream are exposed to light, thereby providing a cell suspension, continuously removing medium and cells from the discharge end of said container, and continuously introducing a nutrient-containing aqueous medium into the other end of the container.

7. A process as in claim 6 in which introduction of said last named aqueous medium is controlled to maintain the cell population density of the suspension substantially constant at any region of the stream.

8. In a process for the production of Chlorella or like algae, the steps of maintaining a flowing stream of a nutrient-containing aqueous medium, said stream being exposed to light and containing available carbon dioxide, causing an algae culture to grow in said medium to provide a flowing algal suspension, and continuously removing cells from said stream.

9. In a process for the production of Chlorella or like algae, the steps of maintaining a continuously flowing stream of a nutrient-containing aqueous medium, said stream being exposed to light, causing an algae culture to grow in said medium to provide a flowing algal suspension, and continuously removing cells from said stream while continuously supplying a nutrient-containing medium to said stream.

10. In a process for the production of Chlorella or like algae, the steps of maintaining a continuously flowing stream of a nutrient-containing aqueous medium, said stream being exposed to light and containing fixed nitrogen and available carbon dioxide, causing algae cells to grow in said stream to provide a flowing algal cell suspension, continuously removing medium and cells from said stream, continuously supplying a nutrient-containing aqueous medium to said stream, and regulating the rate of introduction of aqueous medium to said stream in proportion to the removal of cells from said stream to maintain the cell population density of the remaining stream material substantially constant.

11. In a process for the production of Chlorella or like algae, characterized by the use of an elongated container having an inlet end and an opposite discharge end and formed to admit light to its interior, the steps of maintaining a continuously flowing stream of a nutrient-containing aqueous medium through said container from said inlet end to said discharge end, maintaining the rate of flow through said container at a value sufficient to provide turbulence within the stream, causing cells of an algae culture to grow in the turbulent stream of said medium while said container and said stream are exposed to light, thereby providing a flowing stream of algal cell suspension, continuously removing medium and cells from the outlet end of said container, continuously introducing a substantially cell-free nutrient-containing aqueous medium into the inlet end of said container, and regulating the rate of introduction of said last named medium to maintain the cell population density of the suspension substantially constant at any one region of said stream.

12. In a process for the production of Chlorella or like algae, characterized by the use of an elongated container having at least one side of the same adapted to admit light, the steps of maintaining a continuously flowing stream of a nutrient-containing aqueous medium through said container, said medium containing available carbon dioxide and fixed nitrogen ions, causing cells of an algae culture to grow in said medium while said tank and said stream are exposed to light thereby providing a flowing algal cell suspension, continuously removing medium and cells from the discharge end of said container, continuously separating cells from the medium being discharged from the vessel, and continuously reintroducing into the container a susbtantial amount of the substantially cell-free medium thus removed, said continuously reintroduced medium serving to maintain said continuously flowing stream.

13. A process as in claim 12 in which the available carbon dioxide is provided by carbonating the returned medium.

14. In a process for the production of Chlorella or like algae, characterized by the use of an elongated culture container formed to admit light to its interior, maintaining a continuously flowing stream of a nutrient-containing aqueous medium through said container, causing an algae cell culture to grow in said medium and throughout the length of the container and while said container is exposed to light, continuously removing medium and cells from the discharge end of said container, separating cells from the removed medium, and return removed substantially cell-free medium to the tank at points distributed along the length of the same.

15. A process as in claim 14 in which the returned medium is subjected to carbonation.

16. In a process for the production of Chlorella or like algae, characterized by the use of an extended culture container formed to admit light into its interior, the steps of maintaining a continuously flowing stream of a nutrient-containing aqueous medium through said container, causing an algae cell culture to grow in substantially the entire length of the container, continuously removing medium and cells from one end of said container, causing the major portion of the removed medium to be reintroduced into the container away from said one end and regulating the rate of introduction of medium into said container to maintain the cell population density of the removed material substantially constant.

17. A process as in claim 16 in which makeup nutrients are continuously supplied to the process.

18. In a process for the production of Chlorella or like algae, characterized by the use of an extended culture container formed to admit light into its interior, the steps of maintaining a continuously flowing stream of a nutrient-containing aqueous medium through said container, causing an algae cell culture to grow in substantially the entire length of the container thereby forming a flowing algal cell suspension, continuously removing medium and cells from one end of the container, harvesting cells from the removed medium, carbonating the removed medium, continuously reintroducing removed and carbonated medium into the container at points distributed along the length of the same and away from said one end, and regulating the rate of introduction of medium into said container to maintain the cell population density of the flowing algal cell suspension substantially constant and of substantially the same value for the entire length of the container.

19. Apparatus for the continuous culture and harvesting of Chlorella and like photosynthetic microorganisms, comprising an elongated container formed to admit light to its interior, means for introducing an aqueous nutrient-containing medium into one end of said container, means for continuously removing medium and cells from the other end of said container, and means for impelling said medium to flow at a turbulent velocity within said container.

20. In apparatus for the culture of Chlorella and like photosynthetic microorganisms, an elongated container having at least one transparent wall, means for continuously introducing an aqueous nutrient-containing medium into one end of said container, means for continuously removing medium and cells from the other end of said container at a constant predetermined rate, and means for automatically regulating the rate of introduction of medium into said container to maintain a constant volume of medium in said container, said last means being responsive to the cell population density within the container.

21. In apparatus of the character described for the production of Chlorella and like photosynthetic microorganisms, comprising an approximately horizontally elongated container having at least its upper wall transparent and adapted to rest upon a ground area, said container having its extremities vertically offset to provide for gravity flow from one extremity to the other throughout the length of said container.

22. Apparatus as in claim 21 in which the container is substantially U-shaped.

23. In a process for the production of photosynthetic microorganisms, the steps of maintaining in a body a constant volume of nutrient-containing aqueous medium, causing cells of a photosynthetic microorganism to grow in said medium while said cells are exposed to light, withdrawing a continuous stream of medium containing grown cells from said body, and simultaneously supplying replenishing medium to said body at a rate to maintain said constant volume.

24. In a process for the production of photosynthetic microorganisms, the steps of maintaining in a body a nutrient-containing aqueous medium, causing cells of a photosynthetic microorganism to grow in said medium while said body is exposed to light, withdrawing a continuous stream of medium containing grown cells from said body, separating said cells from said withdrawn stream to leave a substantially cell-free fluid, and returning said fluid substantially in darkness to said body for recycling.

25. In a process for the production of photosynthetic microorganisms, characterized by the use of an elongated container having an opaque inlet conduit at one end, an opaque outlet conduit at the opposite end and a translucent wall between said ends; the steps of continuously flowing through said container from said inlet conduit to said outlet conduit a nutrient-containing aqueous medium at a rate to provide turbulence, causing cells of a photosynthetic microorganism to be present in said medium, and subjecting said cells to illumination in transit as they pass with said turbulent medium adjacent said translucent wall.

26. In a process for the production of Chlorella or like algae, the steps of causing algae cells to grow in an aqueous medium containing nutrients, subjecting the resulting algal cell suspension to carbonation to provide a corbonated medium, forming on said resulting algal suspension a supernatant froth containing some of said cells, removing said froth and said accompanying cells, and utilizing the remaining carbonated medium for further growth of algae.

PAUL M. COOK.

References Cited in the file of this patent

UNITED STATES PATENTS

| Number | Name | Date |
|---|---|---|
| 2,062,755 | Lyons | Dec. 1, 1936 |

OTHER REFERENCES

Myers: J. Gen. Physiol., vol. 28, No. 2, Nov. 20, 1944, p. 103–112.

Ketchum: J. Cellular Comp. Physiol., vol. 33, No. 3, June 1949, pp. 267–279.

Von Witsch: Biol. Zentr. (Germany 1948), vol. 67, pp. 95–100.